Jan. 17, 1961 R. B. RUNKLE 2,968,712
PNEUMATIC HOLD DOWN DEVICE
Filed Aug. 7, 1959 3 Sheets-Sheet 2

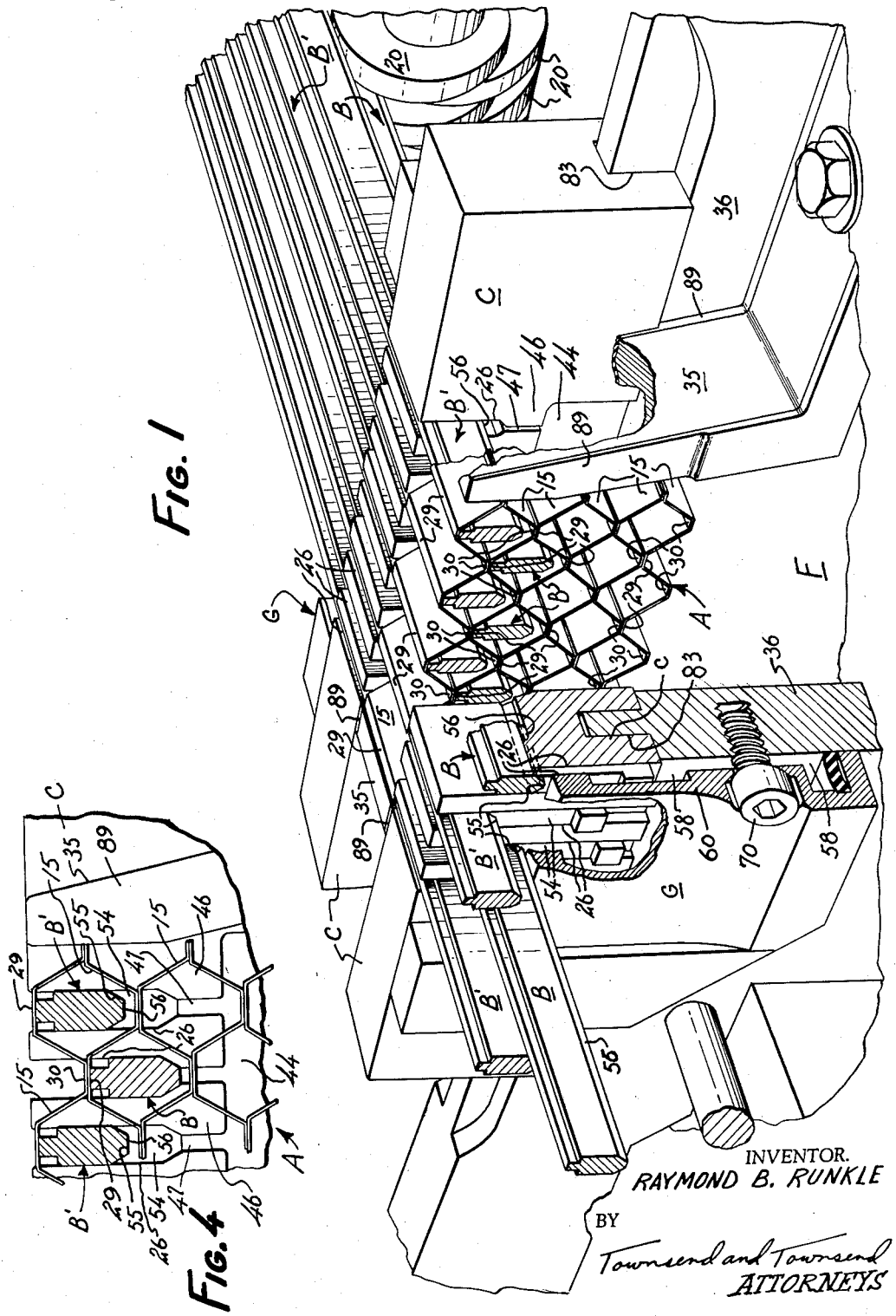

INVENTOR.
RAYMOND B. RUNKLE
BY
Townsend and Townsend
ATTORNEYS

INVENTOR.
Raymond B. Runkle

United States Patent Office 2,968,712
Patented Jan. 17, 1961

2,968,712

PNEUMATIC HOLD DOWN DEVICE

Raymond B. Runkle, Berkeley, Calif., assignor to Hexcel Products Inc., Oakland, Calif., a corporation of California Filed Aug. 7, 1959, Ser. No. 832,408

14 Claims. (Cl. 219—82)

This invention relates to a method of and means for holding superposed corrugated webs in relative registration during joinder of the webs to form honeycomb core.

More specifically this invention is a continuation in part of applicant's patent application Serial No. 654,364, now abandoned and relates to an improvement of a metallic ribbon honeycomb core welding apparatus of the general type which is described in applicant's pending United States patent application Serial No. 627,360.

In welding apparatuses of the above identified type there is provided dual sets of interposed mandrel or finger members disposed to support superposed corrugated metallic webs or ribbons while welding electrodes are traversed across respective welding nodes of the superposed webs to resistance weld the two top superposed webs together. In such a machine each set of mandrels or fingers alternately functions as an electrode to carry welding current through the respective welding nodes of the two top superposed webs and as a support to enable the other set to be withdrawn from the welded honeycomb and placed on top of the last welded web so that the new unwelded web may be placed thereover in superposition with the last welded ribbon.

It is an object of this invention to provide in the aforesaid machine a means for creating an area of minus atmospheric pressure in the cell areas between the unwelded superposed ribbons whereby atmospheric pressure re-acts to force and maintains the superposed ribbons together during a welding operation.

A feature and advantage of this invention is that there are no mechanical members needed to hold the superposed ribbons together and therefore welding electrodes are allowed completely unrestricted access across the outer face of the top ribbon within which to travel during a welding stroke.

Another feature and advantage of this invention is that the novel pneumatic hold down method and means establishes substantially uniform hold down pressure over substantially the entire surface of the superposed unwelded honeycomb ribbons resulting in a uniform urging of the ribbons together throughout their entire area.

Another object of this invention is to provide a novel air lock means which allows welding node supporting mandrels to be freely removed and inserted within the chamber and varied in relative positions of elevation.

Another object of this invention is to provide novel means for properly aligning the webs relative to one another and relative to the vacuum hold down source.

Another object of this invention is to provide a novel system of passageways adapted to form air communication paths through which air may be exhausted from cells of honeycomb core.

Another object of this invention is the provision of means to adapt the pneumatic core holding means to accommodate for fabrication of cores of different sizes and shapes.

A feature and advantage of this invention is that the mandrels or fingers are downwardly seated by pneumatic pressure along with the hold down of the ribbons.

A further object of this invention is to provide a method of fabricating honeycomb core in which one unwelded ribbon is held in registration by pneumatic means during a welding cycle of operation.

A still further object of the invention is to provide uniformly distributed pneumatic forces acting inwardly against reciprocally mounted walls to cause the walls to uniformly move inwardly to align the edges of fabricated core and unwelded ribbon.

Another feature and advantage of this invention is the provision of means whereby the upper cellular area of the layer of honeycomb core and unwelded ribbon is provided with pneumatic pressure substantially greater than the cellular area immediately below.

A further object of this invention is to provide a machine for supporting a workpiece in the throat of a vacuum chamber in which the throat is expandable to allow workpieces to be inserted in the throat and compressible to form an air seal between the workpiece and the throat to cause vacuum biasing of the workpieces together.

A still further object of this invention is to provide a vacuum chamber against the walls of the throat with means to vary the pressure within the chambers relative to the main vacuum chamber so as to cause the opening and closing of the throat walls.

And a still further object of this invention is to provide a secure hold down device in which workpieces are held down on a supporting electrode by pneumatic pressures.

Other objects of the present invention will become apparent upon reading the following specification and referring to the accompanying drawings in which similar characters of reference represent corresponding parts in each of the several views.

In the drawings:

Fig. 1 is a perspective view of the principal embodiment of the invention with portions cut away to show the inner structure thereof.

Fig. 4 is a fragmentary cross section of Fig. 2 taken at line 4—4.

Figure 3:
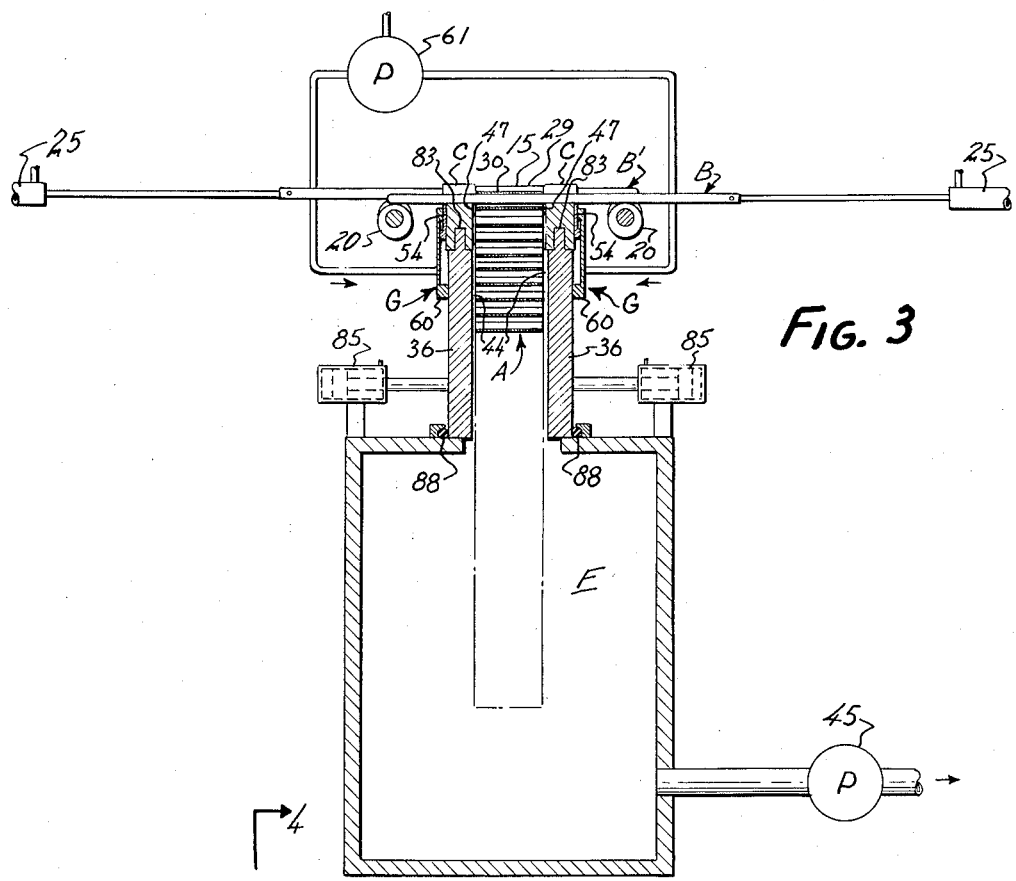
Fig. 3 is a schematic view of the principal embodiment of the invention showing relative location of the pneumatic flow generating means and respective manifolds therefor.
Figure 2:
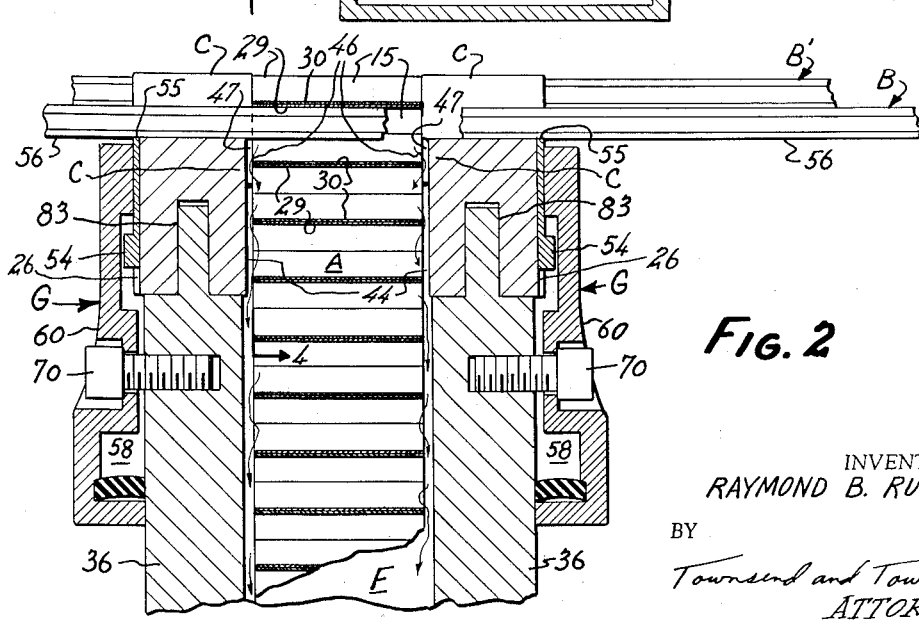
Fig. 2 is a cross section of Fig. 1 taken at line 2—2.

The instant invention is incorporated in combination with a welding machine which is arranged to sequentially resistance weld adjacent surfaces of corrugated metal webs in node to node relation to form an integral welded honeycomb structure of open ended cells extending in a common direction and with the edges of the web relatively aligned in coplanar relation.

In the welder the honeycomb structure is arranged to be supported by two sets of mandrel finger members extending in a common direction and with each set of fingers being arranged to be alternately positioned within the cells of one of the two top rows of cells and reciprocally movable from a first position in support of the cells to a second position wherein the set of fingers within the lower of the two rows of cells is withdrawn from contact with the structure and thence relatively raised in elevation and inserted in the half cell area defined by corrugations of the top surface of the welded honeycomb structure. By this mechanism respective metal webs may be added in node to node relation to the structure and welded to the structure by passing electrical welding current through the last added web and the top web of the structure to the mandrel or set of fingers supporting the structure. During the aforesaid welding operation the top set of fingers are disposed within the cell area defined by the newly added web and the top web of the structure.

The basic structure to accomplish the aforesaid welding operation is fully described in applicant's pending United States patent application Serial No. 627,360.

Essentially the subject invention relates to an improvement of the aforesaid pending United States patent application by providing in combination with the aforesaid structure pneumatic means for holding the last web against the honeycomb structure and downwardly seating the mandrels prior to and during the welding operation and with the further provision of an edge alignment means to align the respective edges of the last added web and honeycomb structure in coplanar relation.

Referring now to the drawings the aforesaid welding apparatus more specifically comprises two sets of welding electrode fingers indicated generally at B and B' which are arranged to support honeycomb structure A. The fingers of each set are interposed with the fingers of the other set of fingers and are positioned in parallel spaced alignment by two parallel spaced apart comb plates C.

The area between the two comb plates defines a work area in which honeycomb structure A is fabricated and supported by the respective sets of fingers.

The elevation of each set of fingers is maintained by the cam shafts 20 adjacent the outer face of comb plate C. Cams 20 are arranged to alternately position sets of fingers B and B' in relative upper and lower positions.

Finger withdrawing mechanisms generally indicated at 25 are arranged to withdraw the lower set of fingers from the finger guide grooves 26 formed in comb plate C and then to re-insert the fingers back within the grooves after being raised by cams 20 to the upper position.

Sequentially the honeycomb structure is fabricated by first positioning a corrugated ribbon 15 formed with an upper welding node 29 and a lower welding node 30 on the upper set of fingers so that each upper welding node 29 rests on the top surface of the upper of the two sets of fingers, thereafter the lower set of fingers is withdrawn from the work area and raised in relative position with respect to the web supporting fingers and thence repositioned within the work area so that the fingers are disposed above the lower welding node 30 of corrugated ribbon 15. Thereafter a new corrugated ribbon 15 is applied on top of the top set of fingers with upper welding node 29 disposed over the top set of fingers and with lower welding node 30 juxtaposed the upper welding node of bottom ribbon 15. A welding electrode (not shown) is thence arranged to traverse along the top of lower welding node 30 of the top ribbon 13 to pass current through juxtaposed nodes 29 and 30 to the mandrel fingers of the bottom set of mandrel fingers thus affording a resistance welded seam joining the two superposed ribbons together to form the first cell of honeycomb structure A as clearly illustrated in Fig. 1. Thereafter the process is repeated by withdrawing the bottom set of fingers and re-inserting it over the top ribbon of the welded honeycomb structure in the same manner as hereinbefore described.

In general, the structure thus far defined is covered specifically in said copending application Serial No. 627,360, and the same does not therefore per se constitute a part of the present invention.

According to the present invention the top unwelded ribbon is pneumatically held in tight juxtaposition with the top ribbon of structure A to provide the welding electrode free unrestricted access over the entire top surface of the top unwelded ribbon.

To facilitate the top ribbon hold down there is provided a vacuum, to provide an area of reduced pressure in the cell area defined by the top of the honeycomb structure and the last unwelded ribbon until the unwelded ribbon can be welded to form an integral part of structure A. To form the aforesaid vacuum there is provided an air chamber F which is evacuated by a pump 45. Air chamber F has a top opening defined by a throat forming the work area comprising two fixed end plates 35 and two reciprocally movable side plates 36. The top of each side plate is fitted with comb member C which guide finger mandrels B and B'. The work area thus is defined in a rectangle by end plates 35 and combs C on side plates 36. Each ribbon 15 is formed of sufficient length and width so the longitudinal and transverse edges of the ribbons abut the walls of end plates 35 and combs C to substantially form an air seal covering the mouth of the throat or work area when the ribbon is supported on one or the other of fingers B and B'. Thus with the ribbons in welding position air chamber F is substantially sealed to the atmosphere on the sides by ribbons hereinafter described and with the ribbon 15 forming sealing or throttling means for the mouth of the throat to the extent that pump 45 can withdraw air from the respective cells faster than air can be drawn into the cell areas. It is thus readily apparent that when pump 45 evacuates vacuum chamber F atmospheric pressure will force top ribbon 15 downwardly against its supporting fingers or mandrels.

The inside face of plate 36 and the bottom of combs C are recessed as at 44 to provide a spaced area between the walls of the throat and the honeycomb in the throat therein providing air communication between the chamber F and the cell areas of core in the throat. The upper area of comb plate C projects inwardly to form an edge alignment and air seal surfaces 46 to abut the edge of the upper three of four ribbons of the honeycomb structure A.

Passageways 47 are provided in air seal surface 46 to provide air communication between the chamber F and the cellular area formed by the upper three ribbons. Vertically grooved channels formed in surface 46 of plates C centered with respect to the comb slots form the passageways 47 so air is exhausted from the top two rows of cells from under the fingers B and B'. By this means air is exhausted to manifold F from the respective upper row of cells of structure A and cells formed between the top of structure A and newly added ribbon 15 through the air communication passageways. This creates a partial vacuum under the last added ribbon for the ribbon and mandrel hold down.

Structure A as it is progressively fabricated is stored in the throat area between plates 36 and as it progressively grows in length by the addition of new ribbons 15 the structure is stored in the body of vacuum chamber F.

An air lock valve generally indicated at G is provided to seal the area of each guide groove 26 under the bottom of each finger of the two sets of fingers B and B' when a set of fingers is elevated above the bottom of the slots provided in comb plate C. The valve comprises a plurality of reciprocally mounted pistons 54 each having its top edge 55 complementally shaped with the bottom 46 of an associated finger B or B'. Piston 54 is pneumatically urged upwardly by air within an air pressure manifold 58 formed on the outside wall of plate 36 by a manifold cover plate 60. Each manifold 58 is provided with air pressure substantially above atmospheric by a pump 61 to force piston 54 upwardly in engagement with the lower edge of the fingers regardless of the relative elevation of the fingers. Thus pistons 54 function as followers to the fingers to maintain an air lock or seal adjacent the grooves 26 where each of the fingers egresses from the vacuum area.

In operation air is withdrawn from the respective cellular area into vacuum chamber F. The areas under the top cells, however, are maintained at a substantially higher vacuum or lower pressure than the top cells because of the greater leakage of air associated with the cellular areas at the top of the structure and the larger air communication access to the second row of cells, which is clearly illustrated in Fig. 4. For this reason the top unwelded ribbon is forced downwardly by atmospheric pressure and the second ribbon is forced down by the greater air pressure within the top row of cells so that both structure A and the unwelded ribbon are forcefully urged downwardly against their supporting mandrels. This force tends to forcefully seat the mandrels in position within guide combs C.

Manifold cover plate 60 is mounted to side plate 36 by screws 70 so the entire valve G may be easily removed. Comb sections C are formed as separate units also easily removably mounted on plates 36 by a tongue and groove fitting 83. This facilitates removal of comb C to accommodate for the placement of alternate size comb plates C so that cell structures of different sizes may be fabricated with the aforesaid unit. When different sized comb plates C are employed sets of fingers B and B' are similarly exchangeable and an alternate air lock valve dimensioned in conformity with the alternate sized fingers B and B' may also be readily substituted for valve G. Thus the unit is sufficiently flexible to be used to fabricate cell structure A of different cell sizes and shapes.

Edge alignment of the last added unwelded ribbon with the structure is obtained by each side plate 36 being reciprocally movable inwardly and outwardly from the work area by motors such as diagrammatically indicated at 85. The bottom of each plate 36 is sealed with flexible air sealing means 88 to retain the air sealed relationship between plates 36 and the manifold chamber F. Similarly side members 35 are provided on their two edges with an expandable gasket indicated at 89 to retain the air lock co-action between members 35 and side plates 36 even when the comb plates are extending to their furthest apart position.

When side plates 36 are extending to their furthest apart position there is provided space to allow for unobstructed insertion of new ribbons 15 in the work area thence thereafter when the plates 36 are forced together their inner faces 46 act to force the vertical edges of newly added ribbon 15 in coplanar alignment with the vertical edges of the fabricated structure of honeycomb core A disposed in the throat or work area.

Thus each new ribbon 15 added to structure A is provided with an unobstructed access so that it may be inserted in position for welding to structure A. Thereafter side plates 36 are forced together by motor means 85 to force edge alignment of newly added ribbon 15 and structure A. During this time air vacuum chamber F is arranged to withdraw air between the newly added ribbon 15 and integral structure A so that atmospheric pressure effectively holds the newly added ribbon against structure A in a position to receive the welding electrodes to weld seams integrally joining newly added ribbon 15 to structure A.

It is noted that side plate 36 and combs C are subjected to substantially uniform minus atmospheric pressure throughout the inside surface area of the combs C and sides 36 wherein atmospheric pressure tends to force the plates and combs inwardly. For this reason motor means 85 can be a single acting arrangement operable to only pull sides 36 apart so that atmospheric pressure solely can be relied upon to force the sides back together. When this means of returning the sides 36 is used there is substantially uniform force along the length of the combs C to effect uniform alignment of the unwelded ribbons and the welded core.

Figure 5:
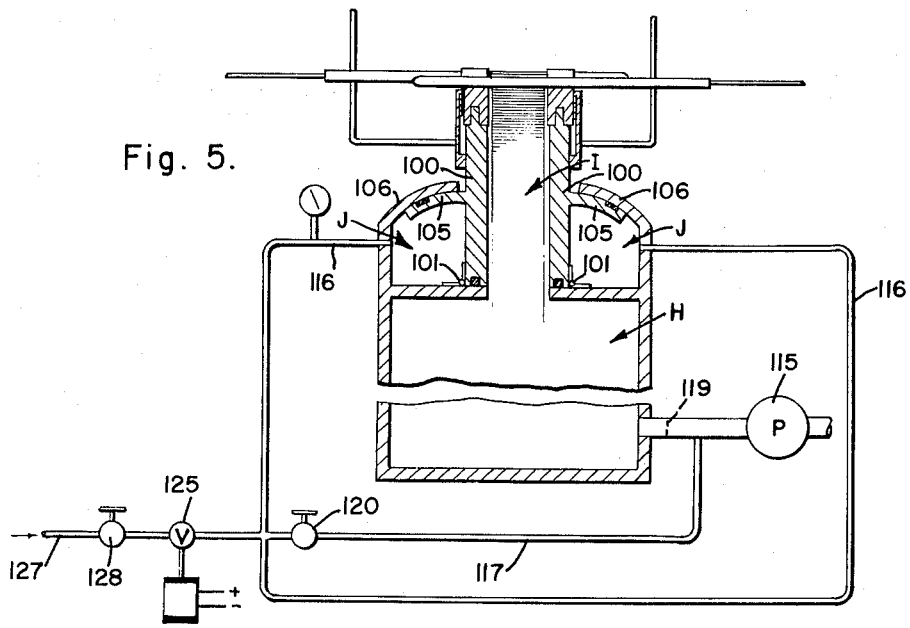
Fig. 5 is a diagrammatic view showing a modification of the invention.
Figure 6:
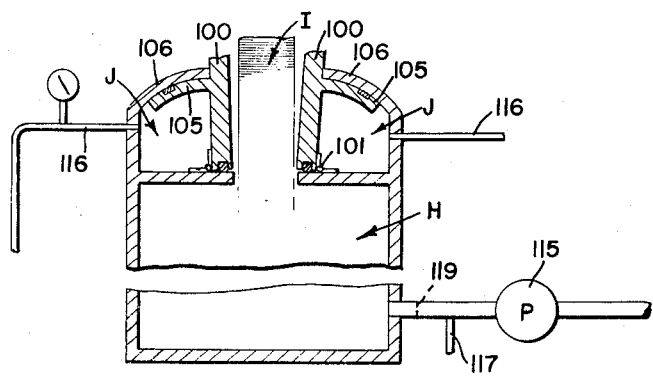
Fig. 6 is a view similar to Fig. 5 shown in a different position of operation.

Referring to Figs. 5 and 6, there is provided a modification of the invention in which the plates are arranged to move towards and away from the throat by means of pressure differential within a vacuum chamber or manifold associated with each plate.

A main vacuum chamber H is provided with a throat I formed by two side plates 100. The side plates 100 are pivotally maintained by a hinge at 101 so that they may swing inwardly or outwardly to either decrease or enlarge the throat area. The outer face of each plate 100 is provided with an outwardly projecting curved panel 105 which mates with a similar panel 106 forming the upper wall of secondary vacuum chambers J. The secondary vacuum chambers are arranged adjacent the outside walls of the plates 100 in such a way as to create a controlled pressure area on the outer face of the two plates. By means of the two curved plates 105 and 106 the two plates 100 can swing towards and away from each other while maintaining the secondary vacuum chambers J in substantially sealed condition. It can be seen that when the pressure within the secondary vacuum chambers J exceeds the pressure within the main vacuum chamber H, there will be pneumatic force that will tend to force the two plates 100 inwardly. Conversely, if the pressure within the secondary vacuum chambers are lower than the pressure within the main vacuum chamber H, then the plates 100 will be moved outwardly. To accomplish the pressure differential, pump 115 which normally carries the air from the vacuum chamber H is arranged to draw air through a line 116 and 117 from the vacuum chambers J. The orifice opening from pump 115 to the vacuum chamber H is restricted as at 119 so that normally, pump 115 will cause a greater vacuum in vacuum chambers J than in the main vacuum chamber H. Valves 120 and 128 are pre-set throttles which control the pressure in chambers J to a value intermediately between atmospheric pressure and the pressure at pump 115 when solenoid actuated valve 125 is in open position. In such condition the solenoid actuated valve 125 permits atmospheric bleed air to enter the system. This pressure is pre-set to provide the desired differential forces acting on the faces of plates 100 to urge them into contact with the honeycomb. With solenoid actuated valve 129 in the closed position, full pump vacuum is communicated to chambers J causing the resultants of the differential pressures acting on the faces of plates 100 to urge the plates into outward position.

When pump 115 is in operation, normally air is withdrawn from the main vacuum chamber H and directly from the secondary vacuum chambers J. A greater vacuum is caused in the secondary vacuum chambers J thus resulting in pressure forcing the plates 100 outwardly. When solenoid valve 125 is actuated air from the atmosphere enters the system thus reducing the vacuum in secondary vacuum chambers J and raising the pressure therein. This causes a positive force which forces the two plates 100 together.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a welding machine for sequentially resistance welding adjacent surfaces of corrugated metal webs in node to node relation to form an integral welded honeycomb structure of open ended cells extending in a common direction and with the edges of the webs relatively aligned in coplanar relation, means for holding each new web in a position for welding to the last added welded web of the structure, said means comprising a vacuum chamber formed to accommodate said structure as it is fabricated and having a throat opening through which new webs are positioned for welding to said structure, said throat opening and each new web relatively shaped to form an air seal between said air chamber and the atmosphere while the new web is in position for welding to the last added web of said structure, said vacuum chamber formed to provide air communication means to withdraw sufficient air from the cells formed between the last added welded web of the structure and the new web to bring the cellular areas between said last two webs to substantially below atmospheric pressure whereby atmospheric pressure urges the new web against the last added welded web to hold the two webs tightly together for welding.

2. A welding machine according to claim 1 and wherein said air communication means is formed to withdraw air more slowly from the cellular area between said last added welded web and the top web of said honeycomb structure than the remainder of the cellular area of the welded honeycomb structure to render the top row of cells at greater pressure than the remainder of cells of the honeycomb structure.

3. A welding machine for welding corrugated metal webs to form a cellular honeycomb structure comprising a vacuum chamber formed to accommodate said structure as it is fabricated, and means for connecting the cellular area between an unwelded web and said structure and the vacuum chamber to withdraw sufficient air from the said cellular area into the vacuum chamber to cause the atmospheric pressure on the outside surface of the unwelded web to force the unwelded web against the cellular honeycomb structure.

4. In a welding machine for sequentially resistance welding adjacent surfaces of corrugated metal webs in node to node relation to form an integral welded structure of open ended cells extending in a common direction and with the edges of the webs relatively aligned in coplanar relation, comprising: a chamber, means to evacuate air from said chamber to render the air pressure within the chamber substantially below atmospheric, said chamber formed with a throat to receive webs wherein the webs are welded together to form the integral structure, said throat and webs relatively dimensioned so that edges of the webs co-act with the sides of the throat to form an air lock between the chamber and the atmosphere, the walls of said chamber forming said throat formed with air communication passageways extending between each of the cells formed between the structure and the last added new web and the evacuated portion of said vacuum chamber, whereby atmospheric pressure urges the last added new web against the structure to hold said last added new web tightly in position for welding.

5. In a welding machine for sequentially resistance welding adjacent surfaces of corrugated metal webs in node to node relation to form an integral welded structure of open ended cells extending in a common direction and with the edges of the webs relatively aligned in coplanar relation, a chamber, means to withdraw air from said chamber to render the air pressure within said chamber substantially below atmospheric, said chamber formed with a throat to receive webs wherein the webs are welded together to form the integral structure, said throat and webs relatively dimensioned so the edges of the webs are disposed to abut the sides of the throat to form an air lock between the air chamber and the atmosphere, said throat having two side walls disposed in coplanar relation with the two opposite edges of said structure, at least one said side wall reciprocally movable in a first position toward and a second position away from the structure within the throat, wherein in the first position said side walls are disposed to align said structure and last added new web, and in the second position the throat area is provided with sufficient room to insert a new web for welding to the structure, at least one said side wall formed with air passageway means to form an air communication path from the vacuum chamber to the cellular area between the structure and the last added web to render the air pressure within said cellular areas below atmospheric whereby atmospheric pressure urges the new web against the last added web to hold the last added web tightly against the structure for welding.

6. In a welding machine for sequentially resistance welding adjacent surfaces of corrugated metal webs in node to node relation to form an integral welded honeycomb structure of open ended cells extending in a common direction with the edges of the web relatively aligned in coplanar relation, and with said structure supported by two sets of finger members extending in a common direction with each set of fingers arranged to be alternately reciprocally withdrawn elevated and reinserted for positioning within the cells of one of the two top rows of cells as each new corrugated metal web placed in a position to be welded to the structure, the combination of: an air chamber having a throat structure formed with an opening to receive each new web and notched to receive said fingers extending transversely across the opening wherein the webs are supported by the fingers within the throat in a position for the webs to be welded together to form the integral honeycomb structure, means to evacuate air from said chamber to render the chamber substantially below atmospheric pressure, said throat and webs relatively dimensioned so that the edges of the webs abut the sides of the throat to form an air lock between the chamber and the atmosphere, air passageway means formed in the throat to draw air from the cells formed between the structure and the last added web into the chamber, and air lock means forming an air seal between the bottom of each finger and said notched throat structure.

7. A device according to claim 8 and wherein said air lock means comprises a plurality of reciprocally mounted follower members each having a sealing surface formed complementally to the shape of the bottom surfaces of a respectively associated finger, and means to urge the sealing surfaces of the followers upwardly against the fingers to substantially seal the space between the bottom of each finger and the notch supporting said finger when said fingers are in any of their operative positions.

8. In a welding machine for sequentially resistance welding opposite surfaces of corrugated metal webs in node to node relation to form an integral welded honeycomb structure of open ended cells extending in a common direction with the edges of the webs relatively aligned in coplanar relation, and with said structure supported by two sets of finger members extending in a common direction with each set of fingers arranged to be alternately positioned within the cells of one of the two top rows of cells and reciprocally movable from a first position in support of said cells to a second position wherein the set of fingers within the lower of the two top rows of cells is withdrawn from contact with the structure and thereafter raised in relative position with respect to the structure and re-inserted over the structure in a position to be within the cell formation defined by a new corrugated metal web placed in a position to be welded to the structure, the combination of: a vacuum chamber, a throat for said vacuum chamber formed by two stationary upright end members and two side panels, said throat and said webs relatively dimensioned to form an air seal between said air chamber and the atmosphere, said side panels notched to receive said fingers wherein said fingers are positionable within said throat to support said structure and unwelded webs, means to withdraw air from said chamber to render the air pressure within the chamber substantially below atmospheric, air passageway means formed in said side panels forming air passageways opening from said chamber to the cell structures formed between the structure and the last added web, said side panels reciprocally slidable outwardly to a first position wherein said throat is wider than the edge to edge dimension of said web and inwardly to a second position wherein the side panels are positioned to force the edges of said last added web in coplanar relation with the edges of said honeycomb structure, and air lock means to seal the space between the bottom of each finger and the notches in the side panels receiving said fingers.

9. A device according to claim 8 and wherein said air lock means comprises a plurality of reciprocally mounted follower members each having a sealing surface formed complementally to the shape of the bottom surfaces of a respectively associated finger, and means to urge the sealing surfaces of the followers upwardly against the fingers to substantially seal the space between the bottom of each finger and the notch supporting said finger when said fingers are in any of their operative positions.

10. In the art of joining progressively node to node corrugated sections of sheet metal on a supporting mandrel to form a unitary honeycomb section, a method of maintaining said sections in node to node alignment on the mandrel during the joining process comprising the steps of supporting the joined corrugated sections on the mandrel, placing a corrugated section on the joined sections in node to node alignment, vacuumizing the air space between the previously corrugated sections to a first air pressure and vacuumizing the air space between the unjoined corrugated section and the joined corrugated sections to a second air pressure while subjecting the outer surface of the unwelded corrugated section to atmospheric pressure and wherein said first and second pressures are substantially lower than atmospheric pressure and said second pressure is substantially higher than said first pressure.

11. A machine for supporting a workpiece having a predetermined dimension comprising a vacuum chamber; means to withdraw air from said chamber; a throat opening to said chamber formed by four spaced apart walls; throat wall moving means to move two opposite throat walls towards and away from each other; and support means in said throat to support workpieces within said throat; said throat dimension to abut the edges of the workpieces when the movable walls are moved towards each other to form a sufficient air seal to cause atmospheric pressure to force the workpieces against the support means.

12. A machine for supporting a workpiece having a predetermined dimension comprising a vacuum chamber; means to withdraw air from said chamber; a throat opening to said chamber formed by four spaced apart walls; throat wall moving means to move two opposite throat walls towards and away from each other; support means in said throat to support workpieces within said throat; said throat dimension to abut the edges of the workpieces when the movable walls are moved towards each other to form a sufficient air seal to cause atmospheric pressure to force the workpieces against the support means; said wall moving means including a second chamber mounted on the outside of said two movable walls; and means to alternately raise and lower the pressure in said second chamber to create pressure differential relative the pressures on the inside faces of said walls to cause the inward and outward movement of said walls.

13. A machine for supporting a workpiece having a predetermined dimension comprising a vacuum chamber; means to withdraw air from said vacuum chamber; a throat leading to said vacuum chamber formed by at least one movable wall; an air chamber mounted on the outside of said movable wall to cause said movable wall to move inwardly and outwardly to relatively decrease and increase the cross sectional dimension of said throat; and means to adjust the air pressure within said air chamber to a level above the pressure against the inside face of said movable wall and to a level below the pressure against the inside face of said movable wall to cause the respective closing and opening of said movable wall.

14. In a machine for bonding workpieces having a predetermined dimension comprising a chamber, means to withdraw air from said chamber to render the air pressure within said air chamber substantially below atmospheric pressure; said chamber formed with a throat to receive workpieces; said throat and workpieces relatively dimensioned so that the edges of the workpieces abut the sides of the throat to form an air lock between the air chamber and the atmosphere; said throat having two side walls positioned against two opposite edges of said workpieces, at least one said side wall movable in a first position toward and in a second position away from workpieces within said throat, said side walls in the first position aligning said workpieces against the walls of said throat and in the second position providing sufficient space to insert a new workpiece; wall moving means comprising a second air chamber on the outside of the movable wall of said throat and means to raise the pressure within said second chamber above the pressure in said first chamber to move the movable wall in the first position and to reduce the air pressure in said second air chamber below the pressure in said first air chamber to move the movable wall to the second position.

References Cited in the file of this patent

UNITED STATES PATENTS 2,458,302    Richardson _____ Jan. 4, 1949